United States Patent
Wilhelm

[15] 3,644,198
[45] Feb. 22, 1972

[54] HYDROGEN-CONSUMING PROCESS AND CATALYST THEREFOR

[72] Inventor: Frederick C. Wilhelm, Arlington Heights, Ill.

[73] Assignee: Universal Oil Products Company, Des Plaines, Ill.

[22] Filed: May 11, 1970

[21] Appl. No.: 36,374

Related U.S. Application Data

[63] Continuation-in-part of Ser. No. 15,960, Mar. 2, 1970.

[52] U.S. Cl.................208/111, 208/112, 208/216, 208/255, 252/460, 252/466 B, 252/472, 260/667
[51] Int. Cl.................C10g 23/02, B01j 11/40, C10g 23/00
[58] Field of Search................208/111, 216, 255, 112; 260/667; 252/460, 466, 472

[56] References Cited

UNITED STATES PATENTS

| | | | |
|---|---|---|---|
| 3,271,325 | 9/1966 | Davies et al. | 252/466 B |
| 3,399,132 | 8/1968 | Mulaskey | 208/111 |
| 3,531,543 | 9/1970 | Clippinger et al. | 260/683.3 |

*Primary Examiner*—Delbert E. Gantz
*Assistant Examiner*—G. E. Schmitkons
*Attorney*—James R. Hoatson, Jr. and Robert W. Erickson

[57] ABSTRACT

A hydrocarbon hydroprocess utilizing a catalytic composite of a porous carrier material, a nickel component, a Group VIII noble metal component and a Group IV-A metal component, in which process there is effected a chemical consumption of hydrogen. A specific example of one such catalyst is a composite of a crystalline aluminosilicate, a nickel component, a platinum component, and a germanium component, particularly for utilization in a hydrocracking process. Other hydrocarbon hydroprocesses are directed toward the hydrogenation of aromatic nuclei, the ring-opening of cyclic hydrocarbons, desulfurization, denitrification, hydrogenation, etc. The catalyst contains 0.01 to about 2.0 percent by weight of the noble metal component, 0.01 to about 5.0 percent by weight of the nickel component, and the atomic ratio of the Group IV-A metal component to the noble metal component is in the range of 0.05:1 to 10.0:1.

13 Claims, No Drawings

HYDROGEN-CONSUMING PROCESS AND CATALYST THEREFOR

RELATED APPLICATION

The present application is a continuation-in-part of my copending application, Ser. No. 15,960 filed Mar. 2, 1970, all the teaching of which copending application are incorporated herein by specific reference thereto.

The present invention involves the use of a catalytic composite of a porous carrier material, a nickel component, a Group VIII noble metal component and a Group IV-A metal component in a process for hydrotreating, or hydroprocessing of hydrocarbons and mixtures of hydrocarbons, in which composite, the atomic ratio of the nickel component to the noble metal component is in the range of about 0.2:1 to about 20.0:1. As utilized herein, the term "hydrotreating" is intended to be synonymous with the term "hydroprocessing," and alludes to the conversion of hydrocarbons at operating conditions which are selected to effect the chemical consumption of hydrogen while carrying out the intended reaction or reactions. Processes intended to be encompassed by the term "hydroprocessing" include hydrocracking, aromatic hydrogenation, ring-opening, hydrorefining (for nitrogen removal and olefin saturation), improvement of kerosene fractions for jet fuel production, desulfurization (often included in hydrorefining) and hydrogenation, etc. As will be readily recognized, one common attribute of these processes, and the reactions being effected therein, is that they are "-hydrogen-consuming;" therefore, they are principally exothermic in nature. The individual characteristics of the foregoing hydrotreating processes, including preferred operating conditions and techniques, and catalytic composites, will be hereinafter described in greater detail.

The subject of the present invention involves the use of a catalytic composite which has exceptional activity and resistance to deactivation when employed in a hydrogen-consuming process. Such processes require a catalyst having both a hydrogenation function and a cracking function. More specifically, the contemplated processes utilize a dual-function catalytic composite which affords substantial improvements in those hydroprocesses that have traditionally used a dual-function catalyst. The catalytic composite constitutes a porous carrier material, a nickel component, a Group VIII noble metal component and a Group IV-A metal component; more specifically, for example, an improved hydrocracking process utilizes a crystalline aluminosilicate carrier material, a nickel component, a platinum or palladium component and a germanium component for improved activity, product selectivity and operational stability characteristics. Specific details regarding particular catalytic composites, for use in a particular hydrocarbon hydroprocess, are hereinafter further delineated.

Composites having dual-function (cracking-hydrogenation) catalytic activity are widely employed in many industries, particularly the petroleum and petrochemical, for the purpose of accelerating a plethora of hydrocarbon conversion reactions. Generally, the cracking function is thought to be associated with an acid-acting material of the porous, adsorptive refractory inorganic oxide type which is utilized as the carrier material for one or more catalytically active metallic components from the metals, or compounds of metals, of Groups V through VIII of the Periodic Table, to which the hydrogenation function is generally attributed. This is not intended to connote that the metallic components are entirely void of a cracking function; those possessing expertise in the art of catalysis are well aware of the fact that a given metal—i.e., nickel—can foster both cracking and hydrogenation, under individually selected conditions of operation.

Such catalytic composites serve to promote multitudinous hydrocarbon conversion reactions such as hydrocracking, isomerization, dehydrogenation, hydrogenation, desulfurization, catalytic reforming, ring-opening, cyclization, aromatization, alkylation and transalkylation, polymerization, cracking, etc., some of which reactions are hydrogen-producing while others are hydrogen-consuming. In using the term "hydrogen-consuming," I intend to exclude those processes wherein hydrogen consumption primarily involves the saturation of light olefins, resulting from undesirable cracking, thereby producing light paraffins, methane, ethane and propane, as experienced in a catalytic reforming process wherein there is an overall net production of hydrogen. In many instances, commercial application of these catalysts resides in processes where two or more of the aforementioned reactions proceed simultaneously in achieving the desired end result. An example of this type of process is a hydrocracking process wherein the catalysts are utilized to effect selective cracking of high molecular weight materials, and hydrogenation to produce a lower-boiling, more valuable hydrocarbon product. Another such example would be the conversion of aromatic and naphthenic hydrocarbons, via ring-opening and hydrogenation into jet fuel components, principally straight, or slightly branched paraffins.

Regardless of the reaction, or reactions involved, or the particular process, it is very important that the catalyst exhibit not only the capability to perform its specified functions initially, but the propensity to resist deactivation in order to perform them satisfactorily for prolonged periods of time. The analytical terms employed in the art to measure how efficient a particular catalyst performs its intended function, in a particular hydrocarbon conversion process, are activity, selectivity and stability. These terms are conveniently defined herein, for a given charge stock, as follows: (1) activity is a measure of the ability of the catalyst to convert a hydrocarbon feed stock into specified products at a specified severity level where severity level alludes to the operating conditions employed—the temperature, pressure, liquid hourly space velocity and hydrogen concentration; (2) selectivity refers to the weight percent or volume percent of the reactants that are converted into the desired product and/or products; (3) stability connotes the rate of change of the activity and selectivity parameters with respect to time—obviously, the smaller rate implying the more stable catalyst. With respect to a hydrogen-consuming process, for example hydrocracking, activity, stability and selectivity are similarly defined. Thus, "activity" connotes the quantity of charge stock, boiling above a given temperature, which is converted to hydrocarbons boiling below the given temperature. "Selectivity" refers to the quantity of converted charge stock which boils below the desired end point of the product, as well as above a minimum specified initial boiling point. "Stability" connotes the rate of change of activity and stability. Thus, for example, where a gas oil, boiling above about 650° F., is subjected to hydrocracking, "activity" connotes the conversion of 650° F.-plus charge stock to 650° F.-minus product. "Selectivity" can, for example, allude to the quantity of conversion into gasoline boiling range hydrocarbons—i.e., pentanes and heavier, normally liquid hydrocarbons boiling up to about 400° F., or any other selected end point. "Stability" might be conveniently expressed in terms of temperature increase required during various increments of catalyst life, in order to maintain either the desired activity, or the necessary selectivity. For example, stability can be expressed in terms of required temperature increase per incremental period of catalyst life, the latter expressed as barrels of fresh feed charge per pound of catalyst disposed in the conversion zone, in order to maintain a 60.0 percent production of a pentane-380° F. gasoline fraction.

As is well known to those skilled in the art, the principal cause of observed deactivation, or instability of a dual-function catalyst is associated with the fact that coke forms on the surface of the catalyst during the course of the reaction. More specifically, in the various hydrocarbon conversion processes, and especially those which are categorized as hydrogen-consuming, the operating conditions utilized result in the formation of high molecular weight, solid or semisolid, hydrogen-poor (extremely low hydrogen/carbon atomic ratio) carbonaceous material which coats the surface of the catalyst and reduces its activity capability by shielding its catalytically active sites from the reactants. Accordingly, a major problem facing investigators in this area of the petroleum and petrochemical art, is the continuous development of more active and selective catalytic composites which are not as sensitive to the presence of these carbonaceous materials and/or have the capability to suppress the rate of formation thereof at the operating conditions employed. Viewed in terms of the parameters previously defined, there exists a continuous effort to develop catalysts having superior activity, selectively and stability characteristics.

I have now found a dual-function catalytic composite which possesses improved activity, selectivity and stability when employed in the hydroprocessing of hydrocarbons. In particular, I have found that the use of a catalytic composite of a Group VIII noble metal component, a nickel component and a Group IV-A metal component, composited with a porous carrier material, improves the overall operation of these hydrogen-consuming processes. Moreover, I have determined that a catalytic composite of a crystalline aluminosilicate carrier material, a platinum or palladium component, a germanium component and a nickel component, when utilized in a process for hydrocracking hydrocarbonaceous material into lower-boiling hydrocarbon products, affords substantial improvement in performance and results. The present invention essentially involves the use of a catalyst in which a Group IV-A component and a nickel component have been added to a noble metal-containing, dual-function conversion catalyst, whereby the performance characteristics of the particular process are sharply and materially improved.

As hereinafter set forth, the particular selection of any set of metallic components, as well as the specific concentrations thereof, are primarily dependent upon (1) the hydroprocess being effected, (2) the physical and chemical characteristics of the fresh feed charge stock and, (3) the specifically intended end result.

OBJECTS AND EMBODIMENTS

An object of the present invention is to afford a process for the hydroprocessing of a hydrocarbon, or mixtures of hydrocarbons. A corollary objective is to improve the selectivity and stability of hydroprocessing utilizing a highly active catalytic composite containing a nickel component, a Group IV-A metal component and a Group VIII noble metal component.

A specific object of my invention resides in the improvement of hydrogen-consuming processes including hydrocracking, hydrorefining, ring-opening for jet fuel production, hydrogenation of aromatic hydrocarbons, desulfurization, denitrification, etc.

Therefore, in one embodiment, the present invention encompasses a hydrocarbon hydroprocess which comprises reacting a hydrocarbon with hydrogen at conditions selected to effect the chemical consumption of hydrogen and in contact with a catalytic composite of a Group VIII noble metal component, a nickel component, a Group IV-A metal component and a porous carrier material. In another embodiment, the operating conditions include a pressure of from 400 to 5,000 p.s.i.g., an LHSV (defined as volumes of liquid hydrocarbon charge per hour per volume of catalyst disposed in the reaction zone) of from 0.1 to about 10.0, a hydrogen concentration of from 1,000 to about 50,000 s.c.f./bbl. and a maximum catalyst bed temperature of from 200° F. to about 900° F.

In still another embodiment, the process is further characterized in that the catalytic composite is reduced and sulfided prior to contacting the hydrocarbon feed stream. Furthermore, my invention involves a process for hydrogenating a coke-forming hydrocarbon distillate containing diolefinic and monoolefinic hydrocarbons, and aromatics, which process comprises reacting said distillate with hydrogen, at a temperature below about 500° F., in contact with a catalytic composite of an alumina-containing refractory inorganic oxide, a Group VIII noble metal component, a nickel component, a Group IV-A metal component and an alkalinous metal component and recovering an aromatic, monoolefinic hydrocarbon concentrate substantially free from conjugated diolefinic hydrocarbons.

Another embodiment affords a catalytic composite comprising a substantially pure crystalline aluminosilicate carrier material, at least about 90.0 percent by weight of which is zeolitic, a nickel component, a Group VIII noble metal component and a Group IV-A metal component.

With respect to the catalytic composite, one embodiment involves a catalyst containing from 0.01 to about 2.0 percent by weight of a Group VIII noble metal, 0.01 to about 5.0 percent by weight of a nickel component and an amount of a Group IV-A component such that the atomic ratio of the Group IV-A metal component to the noble metal component is in the range of about 0.5:1 to about 10.0:1. In other embodiments, the catalyst will contain from 0.1 to 3.5 percent by weight of a halogen component.

Other objects and embodiments of my invention relate to additional details regarding preferred catalytic ingredients, the concentration of components in the catalytic composite, methods of catalyst preparation, individual operating conditions for use in the various hydrocarbon hydroprocesses, preferred processing techniques and similar particulars which are hereinafter given in the following, more detailed summary of my invention.

SUMMARY OF INVENTION

As hereinabove set forth, the present invention is directed toward the hydroprocessing of hydrocarbons and mixtures of hydrocarbons, utilizing a particular catalytic composite. This catalyst comprises a porous carrier material having combined therewith a Group VIII noble metal component, a nickel component and a Group IV-A metal component; in many applications, the catalyst will also contain a halogen component, and in some applications, an alkali metal or alkaline-earth metal component. Considering first the porous carrier material, it is preferred that it be a porous, adsorptive, high-surface area support having a surface area of about 25 to about 500 square meters per gram. The porous carrier material is necessarily refractory with respect to the operating conditions employed in the particular hydrotreating process, and it is intended to include those carrier materials which have traditionally been utilized in dual-function hydrocarbon conversion catalysts. In particular, suitable carrier materials are selected from the group of synthetically prepared, or naturally occurring amorphous refractory inorganic oxides including alumina, titania, zirconia, chromia, magnesia, thoria, boria, silica-alumina, silica-magnesia, chromia-alumina, alumina-boria, alumina-silica-boron phosphate, silica-zirconia, etc. When of the amorphous type, a preferred carrier material is a composite of alumina and silica with silica being present in an amount of about 10.0 to about 90.0 percent by weight.

In many hydroprocessing applications of the present invention, particularly hydrocracking heavy hydrocarbonaceous material to produce lower-boiling hydrocarbon products, the carrier material will constitute a crystalline aluminosilicate, often referred to as being zeolitic in nature. This may be naturally occurring, or synthetically prepared, and includes mordenite, faujasite, Type A or Type U molecular sieves, etc. When utilized as the carrier material, the zeolitic material may be in the hydrogen form, or in a form which results from treatment with multivalent cations.

As hereinabove set forth, the porous carrier material, for use in the process of the present invention, is a refractory inorganic oxide, either alumina in and of itself, or in combination with one or more refractory inorganic oxides, and particularly in combination with silica. When utilized as the sole component of the carrier material, the alumina may be of the gamma-, eta-, or theta-alumina type, with gamma-, or eta-alumina generally producing the best results. In addition, preferred carrier materials have an apparent bulk density of about 0.30 to about 0.70 g./cc. and surface area characteristics such that the average pore diameter is about 20 to about 300 angstroms, the pore volume is about 0.10 to about 1.0 milliliters per gram and the surface area is about 100 to about 500 square meters per gram. Whatever type of refractory inorganic oxide is employed, it may be activated prior to use by one or more treatments including drying, calcination, steaming, etc. For example, the alumina carrier may be prepared by adding a suitable alkaline reagent, such as ammonium hydroxide to a salt of aluminum, such as aluminum chloride, aluminum nitrate, etc., in an amount to form an aluminum hydroxide gel which, upon drying and calcination, is converted to alumina. The carrier material may be formed in any desired shape such as spheres, pills, cakes, extrudates, powders, granules, etc., and may further be utilized in any desired size.

When a crystalline aluminosilicate, or zeolitic material, is intended for use as the carrier, it may be prepared in a number of ways. One common way is to mix solutions of sodium silicate, or colloidal silica, and sodium aluminate, and allow these solutions to react to form a solid crystalline aluminosilicate. Another method is to contact a solid inorganic oxide, from the group of silica, alumina, and mixtures thereof, with an aqueous treating solution containing alkali metal cations (preferably sodium) and anions selected from the group of hydroxyl, silicate and aluminate, and allow the solid-liquid mixture to react until the desired crystalline aluminosilicate has been formed. One particular method is especially preferred when the carrier material is intended to be a crystalline aluminosilicate. This stems from the fact that the method will product a carrier material of substantially pure crystalline aluminosilicate particles. In employing the term "substantially pure," the intended connotation is an aggregate particle at least 90.0 percent by weight of which is zeolitic. This carrier is, therefore, distinguished from an amorphous carrier material, or prior art pills and/or extrudates in which the zeolitic material might be dispersed within an amorphous matrix, with the result that only about 40.0 to about 70.0 percent by weight of the final particle is zeolitic. The preferred method of preparing the carrier material produces crystalline aluminosilicates of the faujasite modification, and utilizes aqueous solutions of colloidal silica and sodium aluminate. Colloidal silica is a suspension in which the suspended particles are present in very finely divided form—i.e., having a particle size from about 10 to about 500 millimicrons in diameter.

After the solid crystalline aluminosilicate has been formed, the mother liquor is separated from the solids by methods such as decantation or filtration. The solids are water-washed and filtered to remove undesirable ions, and to reduce the quantity of amorphous material; they are then reslurried in water to a solids concentration of about 5.0 to about 50.0 percent. The cake and the water are violently agitated and homogenized until the agglomerates are broken and the solids are uniformly dispersed in what appears to be a colloidal suspension. The suspension is then spray dried by conventional means such as pressuring the suspension through an orifice into a hot, dry chamber. The solids particles are withdrawn from the drying chamber and are suitable for forming into finished particles of desired size and shape. The preferred form of the finished particle is a cylindrical pill, and these may be prepared by introducing the spray-dried particles directly into a pilling machine without the addition of any extraneous lubricant or binder. The pilling machines are adjusted to produce particles having a crushing strength of from 2 to 20 pounds, and preferably from 5 to 15 pounds. The pilled faujasite carrier material, of which at least about 90.0 percent by weight is zeolitic, is activated catalytically by converting the sodium form either to the divalent form, the hydrogen form or mixtures thereof.

One essential constituent of the subject catalytic composite is the Group IV-A metallic component. By the use of the generic term "Group IV-A metallic component," it is intended to include the metals and compounds of the metals of Group IV-A of the Periodic Table, as set forth in Periodic Table of the Elements, E. H. Sargent and Co., 1964. More specifically, it is intended to encompass germanium, and the compounds of germanium; tin, and the compounds of tin; lead, and the compounds of lead; and, mixtures of these metals and/or compounds of these metals. The Group IV-A metallic component may be present in the catalytic composite as an elemental metal, or in chemical combination with one or more of the other ingredients of the composite, or as a compound such as the oxide, sulfide, halide, oxyhalide, oxychloride, aluminate, and the like compounds. Based on the evidence currently available, it is believed that best results are obtained when the Group IV-A metallic component exists in the final composite in an oxidation state above that of the elemental metal, and the subsequently described oxidation and reduction steps, that are preferably used in the preparation of the instant composite, are believed to result in a catalytic composite which contains an oxide of the Group IV-A metallic component such as germanium oxide, tin oxide and lead oxide. Regardless of the state in which this component exists in the composite, it can be utilized therein in any amount which is catalytically effective, with the preferred amount being 0.01 to about 5.0 percent by weight thereof, calculated on an elemental basis. The exact amount selected within this broad range is preferably determined as a function of the particular Group IV-A metal that is utilized. For instance, in the case where this component is lead, it is preferred to select the amount of this component from the low end of this range—namely, about 0.01 to about 1.0 percent by weight. Additionally, as hereinafter set forth, it is preferred to select the amount of lead as a function of the amount of the Group VIII noble metal component. WHere this component is tin, it is preferred to select from the relatively broader range of about 0.5 to about 2.0 percent by weight. And, in the preferred case, where this component is germanium, the selection can be made from the full breadth of the stated range—specifically, about 0.01 to about 5.0 percent by weight, with best results obtainable at about 0.5 to about 2.0 percent by weight. This Group IV-A component may be incorporated in the composite in any suitable manner known to the art such as by coprecipitation or cogellation with the porous carrier material, ion-exchange with the carrier material, or impregnation of the carrier material at any stage in its preparation. It is to be noted that it is intended to include within the scope of the present invention all conventional procedures for incorporating a metallic component in a catalytic composite, and the particular method of incorporation used is not deemed to be an essential feature of the present invention. However, best results are believed to be obtained when the Group IV-A component is uniformly distributed throughout the porous carrier material.

One method of incorporating the Group IV-A component into the catalytic composite involves coprecipitating the component during the preparation of the carrier material. This method typically involves the addition of a suitable soluble compound to the inorganic oxide hydrosol along with a suitable gelling agent and dropping the resultant mixture into an oil bath maintained at elevated temperatures. The droplets remain in the oil bath until they set and form hydrogel spheres. The spheres are withdrawn from the oil bath and aged in an ammoniacal solution. The aged spheres are washed and dried at a temperature of about 200° to 400° F., and thereafter calcined at an elevated temperature of about 850° to about 1,300° F. After drying and calcining the gelled carrier material, there is obtained an intimate combination of alumina and the oxide of the selected metal. A preferred method of incorporating the Group IV-A component into the catalytic composite involves the utilization of a soluble, decomposable compound to impregnate the porous carrier material. In general, the solvent used during this impregnation step is selected on the basis of its capability to dissolve the desired Group IV-A compound without detrimentally affecting the porous carrier material which is to be impregnated; ordinarily, good results are obtained when water or alcohol is the solvent; thus the preferred Group IV-A compounds for use in this impregnation step are typically alcohol-, or water-soluble, and decomposable. Examples of suitable Group IV-A compounds are: germanium difluoride, germanium tetrafluoride, germanium monosulfide, tin dibromide, tin dibromide diiodide, tin dichloride diiodide, tin chromate, tin difluoride, tin tetrafluoride, tin tetraiodide, tin sulfate, tin tartrate, lead acetate, lead bromate, lead bromide, lead chlorate, lead chloride, lead citrate, lead formate, lead lactant, lead malate, lead nitrate, lead nitrite, lead dithionate, and the like compounds. In the case where the Group IV-A component is germanium, a preferred impregnation solution is germanium tetrachloride dissolved in anhydrous ethanol. In the case of tin, tin chloride dissolved in water is preferred. And in the case of lead, lead nitrate in water is preferred. Regardless of which impregnation solution is utilized, the Group IV-A component can be impregnated either prior to, simultaneously with, or after the other metallic components are added to the carrier material. Ordinarily, best results are obtained when this component is impregnated simultaneously with the other metallic components of the composite. Likewise, best results are ordinarily obtained when the Group IV-A component is germanium or a compound of germanium. Regardless of which Group IV-A compound is used in the preferred impregnation step, it is important that the Group IV-A metallic component be uniformly distributed throughout the carrier material. In order to achieve this objective it is preferred to maintain the pH of the impregnation solution in a range of about 1.0 to about 7.0, and to dilute the impregnation solution to a volume which is substantially in excess of the volume of the carrier material which is impregnated. It is preferred to use a volume ratio of impregnation solution to carrier material of at least 1.5:1 and preferably about 2:1 to about 10:1, or more. Similarly, it is preferred to use a relatively long contact time during the impregnation step ranging from about one-fourth hour up to about one-half hour or more, before drying to remove excess solvent, in order to insure a high dispersion of the Group IV-A metallic component. The carrier material is, likewise preferably constantly agitated during this preferred impregnation step.

As previously indicated, the catalyst for use in the process of the present invention also contains a Group VIII noble metal component. Although the process of the present invention is specifically directed to the use of a catalytic composite containing platinum, it is intended to include other Group VIII noble metals such as palladium, rhodium, ruthenium, osmium and iridium. The Group VIII noble metal component for example platinum, may exist within the final catalytic composite as a compound such as an oxide, sulfide, halide, etc., or in an elemental state. The Group VIII noble metal component generally comprises about 0.1 to about 2.0 percent by weight of the final composite calculated on an elemental basis. Excellent results are obtained when the catalyst contains about 0.05 to about 1.0 percent by weight of the Group VIII noble metal. In addition to platinum, another particularly preferred Group VIII noble metal component is palladium, or a compound of palladium.

The Group VIII noble metal component may be incorporated within the catalytic composite in any suitable manner including coprecipitation or cogellation with the carrier material, ion-exchange or impregnation. A preferred method of preparation involves the utilization of a water-soluble compound of a Group VIII noble metal component in an impregnation technique. Thus, a platinum component may be added to the carrier material by commingling the latter with an aqueous solution of chloroplatinic acid. Other water-soluble compounds of platinum may be employed, and include ammonium chloroplatinate, platinum chloride, dinitro diamino platinum, etc. The use of a platinum chloride compound, such as chloroplatinic acid, is preferred since it facilitates the incorporation of both the platinum component and at least a minor quantity of the halogen component in a single step. In addition, it is generally preferred to impregnate the carrier material after it has been calcined in order to minimize the risk of washing away the valuable Group VIII noble metal compounds; however, in some instances, it may prove advantageous to impregnate the carrier material when it exists in a gelled state. Following impregnation, the composite will generally be dried at a temperature of about 200° to about 400° F., for a period of from 2 to about 24 hours, or more, and finally calcined at a temperature of about 700° to 1,100° F., in an atmosphere of air, for a period of about 0.5 to about 10 hours.

Yet another essential ingredient of the present catalytic composite is a nickel component. This component may be present in the composite as an elemental metal, or in chemical combination with one or more of the other ingredients of the composite, or as a chemical compound of nickel such as nickel oxide, sulfide, halide, oxychloride, aluminate and the like. The nickel component may be utilized in the composite in any amount which is catalytically effective, with the preferred amount being about 0.1 to about 5.0 percent by weight thereof, calculated on an elemental nickel basis. Typically, best results are obtained with about 0.5 to about 2.0 percent by weight of nickel. Additionally, it is preferred to select the specific amount of nickel, from within this broad weight range, as a function of the amount of the platinum group component. The nickel component may be incorporated into the catalytic composite in any suitable manner known to those skilled in the catalyst formulation art. In addition, it may be added at any stage of the preparation of the composite—either during preparation of the carrier material or thereafter—since the precise method if incorporation used is not deemed to be critical. However, best results are thought to be obtained when the nickel component is relatively uniformly distributed throughout the carrier material, and the preferred procedures are the ones that are known to result in a composite having a relatively uniform distribution. One acceptable procedure for incorporating this component into the composite involves cogelling the nickel component during the preparation of the carrier material. This procedure usually comprehends the addition of a soluble, decomposable compound of nickel such as nickel chloride to the inorganic oxide hydrosol before it is gelled. The resulting mixture is then finished by conventional gelling, aging, drying, and calcination steps as explained hereinbefore. Another preferred way of incorporating this component is an impregnation step wherein the porous carrier material is impregnated with a suitable nickel-containing solution either before, during, or after the carrier material is calcined. Preferred impregnation solutions are aqueous solutions of water-soluble, decomposable nickel compounds such as nickel bromate, nickel bromide, nickel perchlorate, nickel chloride, nickel fluoride, nickel iodide, nickel nitrate, nickel sulfate, and the like compounds. Best results are ordinarily obtained when the impregnation solution is an aqueous solution of nickel chloride or nickel nitrate. This nickel component can be added to the carrier material either prior to, simultaneously with, or after the other metallic components are combined therewith. Best results are usually achieved when this component is added simultaneously with the other metallic components. In fact, excellent results are obtained with a one step impregnation procedure using an aqueous solution comprising chloroplatinic acid, nickel chloride, hydrochloric acid and a suitable compound of the desired Group IV-A metal.

Another ingredient of the instant catalytic composite may be a halogen component. Accordingly, one embodiment of the present invention involves a catalytic composite comprising a combination of catalytically effective amounts of a Group VIII noble metal component, a nickel component, a Group IV-A metallic component, and a halogen component, with the porous carrier material. Although the precise form of the chemistry of the association of the halogen component with the carrier material is not accurately known, it is customary in the art to refer to the halogen component as being combined with the carrier material, or with the other ingredients of the catalyst. The combined halogen may be either fluorine, chlorine, iodine, bromine, or mixtures thereof. Of these, fluorine and particularly chlorine are preferred for the hydrocarbon hydroprocesses encompassed by the present invention. The halogen may be added to the carrier material in any suitable manner, and either during preparation of the carrier or before, or after the addition of the other components. For example, the halogen may be added at any stage in the preparation of the carrier material, or to the calcined carrier material, as an aqueous solution of an acid such as hydrogen fluoride, hydrogen chloride, hydrogen bromide, hydrogen iodide, etc. The halogen component or a portion thereof may be composited with the carrier material during the impregnation of the latter with the Group VIII noble metal component. The inorganic oxide hydrosol, which is typically utilized to form an amorphous carrier material, may contain halogen and thus contribute at least a portion of the halogen component to the final composite. The quantity of halogen is such that the final catalytic composite contains about 0.1 to about 3.5 percent by weight, and preferably from about 0.5 to about 1.5 percent, calculated on an elemental basis.

Regarding the preferred amounts of the various metallic components of the subject catalyst, I have found it to be a good practice to specify the amounts of the nickel component and the Group IV-A metallic component as a function of the amount of the Group VIII noble metal component. On this basis, the amount of the nickel component is ordinarily selected so that the atomic ratio of nickel to the Group VIII noble metal, contained in the composite, is about 0.2:1 to about 20:1, with the preferred range being about 1.0:1 to 20:1. Similarly, the amount of the Group IV-A metallic component is ordinarily selected to produce a composite containing an atomic ratio of Group IV-A metal to Group VIII noble metal within the broad range of about 0.05:1 to 10:1. However, the best practice is to select this ratio on the basis of the following preferred range for the individual species: (1) for germanium, it is about 0.3:1 to 10:1, with the most preferred range being about 0.6:1 to about 6:1; (2) for tin, it is about 0.1:1 to 3:1, with the most preferred range being about 0.5:1 to 1.5:1; and, (3) for lead, it is about 0.05:1 to 0.9:1, with the most preferred range being about 0.1:1 to 0.75:1.

Another significant parameter for the instant catalyst is the "total metals content" which is defined to be the sum of the Group VIII noble metal component, the nickel component and the Group IV-A metallic component, calculated on an elemental metal basis. Good results are ordinarily obtained with the subject catalyst when this parameter is fixed at a value of about 0.15 to about 5.0 percent by weight, with best results ordinarily achieved at a metals loading of about 0.3 to about 2.0 percent.

The following specific illustration presents one suitable method for preparing a catalyst for use in the hydroprocessing of hydrocarbons. An alumina carrier material comprising 1/16-inch spheres was prepared in the manner following: an aluminum hydroxyl chloride sol was first formed by dissolving substantially pure aluminum pellets in a hydrochloric acid solution; hexamethylenetetramine was added to the resulting sol and the resulting solution was gelled by dropping it into an oil bath to form spherical particles of an alumina hydrogel. The resulting hydrogel spheroids were aged and washed with an ammoniacal solution and finally dried and calcined at an elevated temperature to form spherical particles of gamma-alumina containing about 0.3 percent by weight of combined chloride. Additional details regarding this method of preparing the carrier material are given in the teachings of U.S. Pat. No. 2,620,314, issued to James Hoekstra.

A measured amount of germanium tetrachloride was dissolved in anhydrous ethanol. The resulting solution was then aged at room temperature until equilibrium was established. An aqueous solution containing chloroplatinic acid, nickel chloride, and hydrogen chloride was then prepared. The two solutions were then intimately admixed and used to impregnate the gamma-alumina particles in amounts, respectively, calculated to result in a final composite containing on an elemental basis, 0.5 percent by weight germanium, 0.5 percent by weight nickel and 0.375 percent by weight platinum. In order to insure uniform distribution of the metallic components throughout the carrier material, this impregnation step was performed by adding the carrier material particles to the impregnation mixture with constant agitation. In addition, the volume of the solution was approximately two times the volume of the carrier material particles. The impregnation mixture was maintained in contact with the carrier material particles for a period of about one-half hour at a temperature of about 70° F. Thereafter, the temperature of the impregnation mixture was raised to about 225° F. and the excess solution was evaporated over a period of about 1 hour. The resulting dried particles were then subjected to a calcination treatment in an air atmosphere at a temperature of about 925° F. for about 1 hour. The calcined spheres were then contacted with an airstream containing water and hydrochloric acid, in a mole ratio of about 40:1, for about 4 hours at 975° F., in order to adjust the halogen content of the catalyst particles to a value of about 0.9.

The resulting catalyst particles were analyzed and found to contain, on an elemental basis, about 0.375 percent by weight platinum, about 0.5 percent by weight germanium, about 0.5 percent by weight nickel and about 0.85 percent by weight chloride. The atomic ratio of nickel to platinum was approximately 4.4:1. Likewise, the atomic ratio of germanium to platinum was about 3.56:1.

Thereafter, the catalysts particles were subjected to a dry prereduction treatment by contacting them with a substantially pure hydrogen stream containing less than 20 volume p.p.m. of water at a temperature of about 1,000° F., a pressure slightly above atmospheric and a flow rate of the hydrogen stream through the catalyst particles corresponding to a gas hourly space velocity of about 720. This prereduction step was for a duration of about 1 hour.

When used in many of the hydrogen-consuming processes hereinbefore described, the foregoing quantities of metallic components will be combined with a carrier material of alumina and silica, wherein the silica concentration is 10.0 to about 90.0 percent by weight. In those processes wherein the acid function of the catalytic composite must necessarily be attenuated, the metallic components will be combined with a carrier material consisting essentially of alumina. In this latter situation, a halogen component is often not combined with the catalytic composite, and the inherent acid function of Group VIII noble metals (as well as the alumina) is further attenuated through the addition of from 0.01 to about 1.5 percent by weight of an alkalinous metal component.

One such process, in which the acid function of the catalyst employed must necessarily be attenuated, is the process wherein an aromatic hydrocarbon is hydrogenated to produce the corresponding cycloparaffin. Specifically, a benzene-concentrate is often used as the starting material for the production of cyclohexane primarily to satisfy the demand therefor in the manufacture of nylon. In order to avoid ring-opening, which results in loss of both the benzene charge and the cyclohexane product, an alkalinous metal component is combined with the catalytic composite in an amount of from 0.01 to about 1.5 percent by weight. This component is selected from the group of lithium, sodium, potassium, rubidium, cesium, barium, strontium, calcium, magnesium, beryllium, mixtures of two or more, etc. In general, more advantageous results are achieved through the use of the alkali metals, particularly lithium and/or potassium.

In those instances where halogen component is utilized in the catalyst, it has been determined that more advantageous results are obtained when the halogen content of the catalyst is adjusted during the final calcination step through the inclusion of a halogen, or a halogen-containing compound in the air atmosphere. In particular, when the halogen component of the catalyst is chlorine, for example, it is preferred to use a mole ratio of water to hydrochloric acid of about 20:1 to about 100:1 during at least a portion of the calcination step in order adjust the final chloride content of the composite to a range of about 0.5 to about 1.5 percent by weight.

Prior to its use, in the hydroprocessing of hydrocarbons, the resultant calcined catalytic composite may be subjected to substantially water-free reduction technique. This technique is designed to insure a uniform and finely divided dispersion of the metallic components throughout the carrier material. Preferably, substantially pure and dry hydrogen (i.e., less than about 30.0 volume p.p.m. of water) is employed as the reducing agent. The calcined catalyst is contacted at a temperature of about 800° to about 1,200° F., and for a period of about 0.5 to about 2 hours. This reduction technique may be performed in situ as part of a startup sequence provided precautions are observed to predry the unit to a substantially water-free state.

Again, with respect to effecting hydrogen-consuming reactions, the process is generally improved when the reduced composite is subjected to a presulfiding operation designed to incorporate from about 0.05 to about 0.50 percent by weight of sulfur, on an elemental basis. This presulfiding treatment takes place in the presence of hydrogen and a suitable sulfur-containing compound such as hydrogen sulfide, carbon disulfide, lower molecular weight mercaptans, organic sulfides, etc. The procedure involves treating the reduced catalyst with a sulfiding gas, such as a mixture of hydrogen and hydrogen sulfide, which mixture contains about 10 moles of hydrogen per mole of hydrogen sulfide, at conditions sufficient to effect the desired incorporation of sulfur. These conditions include a temperature ranging from about 50° up to about 1,000° F.

According to the present invention, the hydrocarbon charge stock and hydrogen are contacted with a catalyst of the type described above in a hydrocarbon conversion zone. The particular catalyst employed is dependent upon the characteristics of the charge stock as well as the desired end result. The contacting may be accomplished by using the catalyst in a fixed-bed system, a moving-bed system, a fluidized-bed system, or in a batch-type operation. However, in view of the risk of attrition loss of the valuable catalyst, it is preferred to use the fixed-bed system. Furthermore, it is well known, in petroleum refining technology, that a fixed-bed catalytic system offers many operational advantages. In this type of system, a hydrogen-rich gas and the charge stock are preheated by any suitable heating means to the desired temperature, and are then passed into a conversion zone containing the fixed-bed of the catalytic composite. It is understood, of course, that the conversion zone may be one or more separate reactors having suitable means therebetween to insure that the desired conversion temperature is maintained at the entrance to each reactor. It is also to be noted that the reactants may contact the catalyst bed in either upward, downward, or radial flow fashion with a downward flow being preferred. Additionally, the reactants may be in the liquid phase, a mixed liquid-vapor phase, or a vapor phase when they contact the catalyst.

The operating conditions imposed upon the reaction zones are, of course, dependent upon the particular type of hydroprocess being effected. However, these operating conditions will include a pressure from about 400 to about 5,000 p.s.i.g., a liquid hourly space velocity (LHSV) of about 0.1 to about 10.0, and a hydrogen concentration within the range of about 1,000 to about 50,000 standard cubic feet per barrel. In view of the fact that the reactions being effected are exothermic in nature, an increasing temperature gradient is experienced as the hydrogen and feed stock traverse the catalyst bed. For any given hydrogen-consuming process, it is desirable to maintain the maximum catalyst bed temperature below about 900° F., which temperature is virtually identical to that conveniently measured at the outlet of the reaction zone. Hydrogen-consuming processes are conducted at a temperature in the range of about 200° to about 900° F., and it is intended herein that the stated temperature of operation alludes to the maximum catalyst bed temperature. In order to assure that the catalyst bed temperature does not exceed the maximum allowed for a given process, conventional quench streams, either normally liquid or gaseous, and introduced at one or more intermediate loci of the catalyst bed, may be utilized. In some of the hydrocarbon hydroprocesses encompassed by the present invention, and especially where hydrocracking a heavy hydrocarbonaceous material to produce lower boiling hydrocarbon products, that portion of the normally liquid product effluent boiling above the end point of the desired product will be recycled to combine with the fresh hydrocarbon charge stock. In these situations, the combined liquid feed ratio (defined as volumes of total liquid charge to the reaction zone per volume of fresh feed charge to the reaction zone) will be within the range of about 1.1 to about 6.0.

ILLUSTRATIVE EMBODIMENTS

Specific operating conditions, processing techniques, particular catalytic composites and other individual process details will be given in the following detailed description of several of the hydrocarbon hydroprocesses to which the present invention is applicable. These will be presented by way of examples given in conjunction with commercially scaled units. In present these examples, it is not intended that the invention be limited to the specific illustrations, nor it is intended that a given process be limited to the particular operating conditions, catalytic composite, processing techniques, charge stock, etc. It is understood, therefore, that the present invention is merely illustrated by the specifics hereinafter set forth.

EXAMPLE I

In this example, the present invention is illustrated as applied to the hydrogenation of aromatic hydrocarbons such as benzene, toluene, the various xylenes, naphthalenes, etc., to form the corresponding cyclic paraffins. When applied to the hydrogenation of aromatic hydrocarbons, which are contaminated by sulfurous compounds, primarily thiophenic compounds, the process is advantageous in that it affords virtually 100.0 percent conversion without the necessity for the substantially complete prior removal of the sulfur compounds. The corresponding cyclic paraffins, resulting from the hydrogenation of aromatic nuclei, include compounds such as cyclohexane, mono-, di-, tri-substituted cyclohexanes, decahydronaphthalene, tetrahydronaphthalene, etc., which find widespread use in a variety of commercial industries in the manufacture of nylon, as solvents for various fats, oils, waxes, etc.

Aromatic concentrates are obtained by a multiplicity of techniques. For example, a benzene-containing naphtha boiling range fraction may be subjected to distillation to provide a heart-cut which contains the benzene. This is then subjected to a solvent extraction process which separates the benzene from the normal and isoparaffinic components, as well as the naphthenes contained therein. Benzene is readily recovered from the selected solvent, by way of distillation, in a purity of 99.0 percent or more. Heretofore, the hydrogenation of aromatic hydrocarbons, for example benzene, has been effected with a nickel-containing catalyst at hydrogenation conditions. This is extremely disadvantageous in many respects, and especially from the standpoint that nickel is quite sensitive to the minor quantity of sulfurous compounds which may be contained in the benzene concentrate. In accordance with the present process, the benzene is hydrogenated in contact with a nonacidic catalytic composite containing 0.01 to about 2.0 percent by weight of a Group VIII noble metal component, a Group IV-A metal component, a nickel component and from about 0.01 to about 1.5 percent by weight of an alkalinous metal component. Operating conditions include a maximum catalyst bed temperature in the range of about 200° to about 800° F., a pressure of from 500 to about 2,000 p.s.i.g., a liquid hourly space velocity of about 1.0 to about 10.0 and a hydrogen concentration inn amount sufficient to yield a mole ratio of hydrogen to cyclohexane, or other cycloparaffin which corresponds to the aromatic contained within the fresh feed charge stock, in the product effluent from the last reaction zone, not substantially less than about 4.0:1. Although not essential, one preferred operating technique involves the use of three reaction zones, each of which contains approximately one-third of the total quantity of catalyst employed. The process appears to be further facilitated when the total fresh benzene is added in three, approximately equal portions, one each to the inlet of each of the three reaction zones.

The catalyst utilized is a substantially halogen-free alumina carrier material combined with about 0.20 percent by weight of germanium, about 0.40 percent by weight of nickel, 0.40 percent by weight of platinum, and about 0.50 percent by weight of lithium, all of which are calculated on the basis of the elemental metals. The catalyst is disposed in three individual reaction zones in approximately equal portions. The hydrogenation process will be described in connection with a commercially scaled unit having a total fresh benzene feed capacity of about 675 bbl./day (111.67 mols/hr.). Makeup gas in an amount of about 991.66 mols/hr. (639.29 mols/hr. of hydrogen) is admixed with 129.86 mols/hr. of a liquid recycle stream, containing 118.45 mols/hr. of cyclohexane, and 502.29 mols/hr. of a recycled gaseous phase containing 222.99 mols/hr. of hydrogen, the mixture being at a temperature of about 104° F., and further mixed with 32.96 mols/hr., (199 bbl./day) of the fresh benzene feed; the final mixture constitutes the total charge to the first reaction zone.

Following suitable heat-exchange with various hot effluent streams, the total feed to the first reaction zone is at a temperature of 280° F. and a pressure of 481 p.s.i.g. The reaction zone effluent is at a temperature of 485° F. and a pressure of about 473 p.s.i.g. The total effluent from this first reaction zone is admixed with another portion of the fresh benzene feed, 45.52 mols/hr. (275 bbl./day), at a temperature of about 100° F., the resulting mixture having a temperature of about 426° F. The temperature is further decreased to 280° F. through the use of an intercooler, and the mixture enters the second reaction zone at a pressure of about 469 p.s.i.g. The second reaction zone effluent, at a temperature of 484° F., and a pressure of 462 p.s.i.g., is admixed with a third portion of the fresh benzene feed, 33.19 mols/hr. (201 bbl./day), at a temperature of 100° F., whereby the resulting mixture has a temperature of about 450° F. Through the use of another intercooler, the temperature is further decreased to a level of 280° F., and the mixture is introduced into the third reaction zone at a pressure of about 458 p.s.i.g. The third reaction zone effluent is at a temperature of about 425° F. and a pressure of about 450 p.s.i.g. Through utilization as a heat-exchange medium, the temperature is reduced to a level of about 229° F., and subsequently reduced to a level of about 100° F. using an air-cooled condenser. The cooled third reaction zone effluent is introduced into a high-pressure separator, at a pressure of about 420 p.s.i.g.

A hydrogen-rich vaporous phase is withdrawn from the high-pressure separator and recycled by way of compressive means, at a pressure of about 490 p.s.i.g., to the inlet of the first reaction zone. A portion of the normally liquid phase is recycled to the first reaction zone as the cyclohexane concentrate hereinbefore described. The remainder of the normally liquid phase is passed into a stabilizing column functioning at a reduced operating pressure of about 146 p.s.i.g., measured at the bottom, a top temperature of about 335° F. and a bottom temperature of about 372° F. The cyclohexane product is withdrawn from the stabilizer as a bottoms stream, the overhead stream being vented to fuel. The cyclohexane concentrate is recovered in an amount of about 120.07 mols/hr., of which only about 0.10 mols/hr. constitutes other hexanes. In brief summation, of the 8,721 pounds per hour of fresh benzene feed, 10,105 pounds per hour of cyclohexane product is recovered.

EXAMPLE II

Another hydrocarbon hydroprocessing scheme, to which the present invention is applicable, involves the hydrorefining of coke-forming hydrocarbon distillates. These hydrocarbon distillates are generally sulfurous in nature, and contain monoolefinic, diolefinic and aromatic hydrocarbons. Through the utilization of a catalytic composite comprising a Group IV-A component, a nickel component and a Group VIII noble metal component, increased selectivity and stability of operation is obtained; selectivity is most noticeable with respect to the retention of aromatics, and in hydrogenating conjugated diolefinic and monoolefinic hydrocarbons. Such charge stocks generally result from diverse conversion processes including the catalytic and/or thermal cracking of petroleum, sometimes referred to as pyrolysis, the destructive distillation of wood or coal, shale oil retorting, etc. The impurities in these distillate fractions must necessarily be removed before the distillates are suitable for their intended use, or which when removed, enhance the value of the distillate fraction for further processing. Frequently, it is intended that these charge stocks be substantially desulfurized and saturated to the extent necessary to remove the conjugated diolefins, while simultaneously retaining the aromatic hydrocarbons. When subjected to hydrorefining for the purpose of removing the contaminating influences, there is encountered difficulty in effecting the desired degree of reaction due to the formation of coke and other carbonaceous material primarily as a result of polymerization and copolymerization of the diolefins.

As utilized herein, "hydrogenating" is intended to be synonymous with "hydrorefining." The purpose is to provide a highly selective and stable process for hydrogenating a coke-forming hydrocarbon distillate, and this is accomplished through the use of a fixed-bed catalytic reaction system utilizing a catalyst comprising a Group IV-A component, a nickel component and a Group VIII noble metal component. There exists two separate, desirable routes for the treatment of coke-forming distillates, for example a pyrolysis naphtha by product. One such route is directed toward a product suitable for use in certain gasoline, or motor fuel blending. With this as the desired object, the process can be effected in a single stage, or reaction zone, with the catalytic composite hereinafter specifically described as the first-stage catalyst. The attainable selectivity in this instance resides primarily in the hydrogenation of highly reactive double bonds. In the case of conjugated diolefins, the selectivity afforded restricts the hydrogenation to produce monoolefins, and, with respect to the styrenes, for example, the hydrogenation is inhibited to produce alkyl benzenes without "ring" saturation. The selectivity is accomplished with a minimum of polymer formation either to "gums," or lower molecular weight polymers which would necessitate a rerunning of the product before blending to gasoline would be feasible. Some fresh charge stocks are sufficiently low in mercaptan sulfur content that direct gasoline blending may be considered, although a mild treatment for mercaptan sulfur removal might be necessary. Such considerations are generally applicable to foreign markets, particularly European, where olefinic and sulfur-containing gasoline are not too objectionable. It must be noted that the sulfurous compounds, and the monoolefins, whether virgin, or products of diolefin partial saturation, are unchanged in the single, or first-stage reaction zone. Where, however, the desired end result is aromatic hydrocarbon retention, intended for subsequent extraction, the two-stage route is required. The monoolefins must be substantially saturated in the second stage to facilitate aromatic extraction by way of currently utilized methods. Thus, the desired necessary hydrogenation involves saturation of the monoolefins, as well as sulfur removal, the latter required for an acceptable ultimate aromatic product. Attendant upon this is the necessity to avoid even partial saturation of aromatic nuclei.

With respect to one catalytic composite, its principal function involves the the selective hydrogenation of conjugated diolefinic hydrocarbons to monoolefinic hydrocarbons. This particular catalytic composite possess unusual stability notwithstanding the presence of sulfurous compounds in the fresh charge stock. The catalytic composite comprises an alumina-containing refractory inorganic oxide, a nickel component, a lead component, a Group VIII noble metal component and an alkali-metal component, the latter preferably being potassium and/or lithium. It is especially preferred, for use in this particular hydrocarbon hydroprocessing scheme, that the catalytic composite be substantially free from any "acid-acting" propensities. The catalytic composite, utilized in the second reaction zone for the primary purpose of effecting the destructive conversion of sulfurous compounds into hydrogen sulfide and hydrocarbons, is a composite of an alumina-containing refractory inorganic oxide, a nickel component, a Group VIII noble metal component and a tin component. Through the utilization of a particular sequence of processing steps, and the use of the foregoing described catalytic composites, the formation of high molecular weight polymers and copolymers is inhibited to a degree which permits processing for an extended period of time. Briefly, this is accomplished by initiating the hydrorefining reactions at a temperature below about 500° F., at which temperature the coke-forming reactions are not promoted. The operating conditions within the second reaction zone are such that the sulfurous compounds are removed without incurring the detrimental polymerization reactions otherwise resulting were it not for the saturation of the conjugated diolefinic hydrocarbons within the first reaction zone.

The hydrocarbon distillate charge stock, for example, a $C_4$ to $C_9$ heart-cut from a light naphtha byproduct, derived from a commercial cracking unit designed and operated for the production of ethylene, having a gravity of about 46.9° API, a bromine number of about 42.0, a diene value of about 31.0 and containing about 450 p.p.m. by weight of sulfur and 65.0 vol. percent aromatic hydrocarbons, is admixed with recycled hydrogen. The hydrogen concentration is within the range of from about 1,000 to about 10,000 s.c.f./bbl. (i.e., 1,600 s.c.f./bbl.) and preferably in the narrower range of from 1,500 to about 6,000 s.c.f./bbl. The charge stock is heated to a temperature such that the maximum catalyst temperature is in the range of from about 200° to about 500° F., (425° F.) by way of heat-exchange with various product effluent streams, and is introduced into the first reaction zone at an LHSV in the range of about 0.5 to about 10.0 (2.5). The reaction zone is maintained at a pressure of from 400 to about 1,000 p.s.i.g., and preferably at a level in the range of from 500 to about 900 p.s.i.g. (750 p.s.i.g.).

The temperature of the product effluent from the first reaction zone is increased to a level above about 500° F., (625° F.) and preferably to result in a maximum catalyst temperature in the range of about 600° to 900° F. (700° F.). When the process is functioning efficiently, the diene value of the liquid charge entering the second catalytic reaction zone is less than about 1.0 and often less than about 0.3. The conversion of nitrogenous and sulfurous compounds, and the saturation of monoolefins, contained within the first zone effluent, is effected in the second zone. The second catalytic reaction zone is maintained under an imposed pressure of from about 400 to about 1,000 p.s.i.g., and preferably at a level of from about 500 to about 900 p.s.i.g. (750 p.s.i.g.). The two-stage process is facilitated when the focal point for pressure control is the high-pressure separator serving to separate the product effluent from the second catalytic reaction zone. It will, therefore, be maintained at a pressure slightly less than the first catalytic reaction zone, as a result of fluid flow through the system. The LHSV through the second reaction zone is about 0.5 to about 10.0 (2.5), based upon fresh feed only. The hydrogen concentration will be in a range of from 1,000 to about 10,000 s.c.f./bbl., and preferably from 1,000 to about 8,000 s.c.f./bbl. (2,400). Series-flow through the entire system is facilitated when the recycle hydrogen is admixed with the fresh hydrocarbon charge stock. Makeup hydrogen, to supplant the consumed in the overall process, may be introduced from any suitable external source, but is preferably introduced into the system by way of the effluent line from the first catalytic reaction zone to the second catalytic reaction zone. In the instant situation, the overall hydrogen consumption is about 507 s.c.f./bbl., or about 0.97 percent by weight of the fresh feed.

With respect to the naphtha boiling range portion of the product effluent, the sulfur concentration is about 0.1 p.p.m. the aromatic concentration is about 64.5 percent by volume, the bromine number is less than about 0.1 and the diene value is essentially "nil."

With charge stocks having exceedingly high diene values, a recycle diluent is employed in order to prevent an excessive temperature rise in the reaction system. Where so utilized, the source of the diluent is preferably a portion of the normally liquid product effluent from the second catalytic reaction zone. The precise quantity of recycle material varies from feed stock to feed stock; however, the rate at any given time is controlled by monitoring the diene value of the combined liquid feed to the first reaction zone. As the diene value exceeds a level of about 25.0, the quantity of recycle is increased, thereby increasing the combined liquid feed ratio; when the diene value approaches a level of about 20.0 or less, the quantity of recycle diluent may be lessened, thereby decreasing the combined liquid feed ratio.

A pyrolysis gasoline, boiling from 105° to 400° F., having a gravity of about 41.1° API, containing 70 p.p.m. by weight of sulfur, 67.0 percent by volume of aromatics, and having a bromine number of 60 and a diene value of 26, is initially processes in a first reaction zone containing a catalytic composite of alumina, 0.5 percent by weight of lithium. 0.20 percent by weight of lead, 0.375 percent by weight of nickel and 0.375 percent by weight of palladium, calculated as the elements. The fresh feed charge rate is 6,973 bbl./day, and this is admixed with 2,092 bbl./day of a normally liquid diluent. Based upon fresh feed only, the LHSV is 3.0 and the hydrogen circulation rate is 1,300 s.c.f./bbl. The charge is raised to a temperature of about 260° F., and enters the first reaction zone at a pressure of about 750 p.s.i.g. The product effluent emanates from the first reaction zone at a temperature of about 360° F. The effluent is admixed with about 388 s.c.f./bbl. of makeup hydrogen, and the temperature is increased to a level of about 525° F., the heated stream is introduced into the second reaction zone under a pressure of about 750 p.s.i.g. The LHSV, exclusive of the recycle diluent, is 4.0, and the hydrogen circulation rate is about 1,500 s.c.f./bbl. The second reaction zone contains a catalyst of a composite of alumina, 0.50 percent by weight of nickel, 0.50 percent by weight of platinum and 0.25 percent by weight of germanium. The reaction product effluent is introduced, following its use as a heat-exchange medium and further cooling, to reduce its temperature from 600° F. to a level of 100° F., into a high-pressure separator at a pressure of about 750 p.s.i.g. The normally liquid stream from the cold separator is introduced into a reboiled stripping column for hydrogen sulfide removal and depentanization. The hydrogen sulfide stripping column functions at conditions of temperature and pressure required to concentrate a $C_6$ to $C_9$ aromatic stream as a bottoms fraction. With respect to the overall product distribution, only 2.02 percent by weight of butanes and lighter hydrocarbons is indicated in the stripper overhead. With respect to the desired product, the aromatic concentration is 66.7 percent, the sulfur concentration is less than 1.0 p.p.m. by weight, the diene value is essentially "nil" and the bromine number is less than 1.0.

EXAMPLE III

This illustration of a hydrocarbon hydroprocessing scheme is one which involves hydrocracking heavy hydrocarbonaceous material into lower-boiling hydrocarbon products. In this instance, the preferred catalysts contain a Group IV-A component and a Group VIII noble metal component and a nickel component combined with a crystalline aluminosilicate carrier material, preferably faujasite, and still more preferably one which is at least 90.0 percent by weight zeolitic. The Group VIII noble metal component is preferably platinum and/or palladium; and, in some instances, a halogen component may be combined with the catalyst, particularly fluorine and/or chlorine.

Most of the virgin stocks, intended for hydrocracking, are contaminated by sulfurous compounds and nitrogenous compounds, and, in the case of the heavier charge stocks, various metallic contaminants, insoluble asphalts, etc. Contaminated charge stocks are generally hydrorefined in order to prepare a charge suitable for hydrocracking. Thus, the catalytic process of the present invention can be beneficially utilized as the second stage of a two-stage process, in the first stage of which the fresh feed is hydrorefined.

Hydrocracking reactions are generally effected at elevated pressures in the range of about 800 to about 5,000 p.s.i.g., and preferably at some intermediate level of 1,000 to about 3,500 p.s.i.g. Liquid hourly space velocities of about 0.25 to about 10.0 will be suitable, the lower range generally reserved for the heavier stocks. The hydrogen circulation rate will be at least about 3,000 s.c.f./bbl., with an upper limit of about 50,000 s.c.f./bbl., based upon fresh feed. For the majority of feed stocks, hydrogen concentrations in the range of 5,000 to 20,000 s.c.f./bbl. will suffice. With respect to the LHSV, it is based upon fresh feed, notwithstanding the use of recycle liquid providing a combined liquid feed ratio in the range of about 1.1 to about 6.0. The operating temperature again alludes to the maximum temperature of the catalyst within the reaction zone, and is in the range of about 400° to about 900° F. Since the principal reactions are exothermic in nature, the increasing temperature gradient, experienced as the charge stock traverses the catalyst bed, results in an outlet temperature higher than that at the inlet to the catalyst bed. The maximum catalyst temperature should not exceed 900° F., and it is generally a preferred technique to limit the temperature increase to 100° F. or less.

Although amorphous composites of alumina and silica, containing from about 10.0 to about 90.0 percent by weight of the latter, are suitable for use in the catalytic composite employed in the hydrocracking process, a preferred carrier material constitutes a crystalline aluminosilicate, preferably faujasite, of which at least about 90.0 percent by weight is zeolitic. This carrier material, and a method of preparing the same, have hereinbefore been described. The Group VIII noble metal component is generally present in an amount within the range of about 0.01 to about 2.0 percent by weight, and may exist within the composite as a compound such as an oxide, sulfide, halide, etc. Another possible constituent of the catalyst is a halogen component, either fluorine, chlorine, iodine, bromine, or mixtures thereof. Of these, it is preferred to utilize a catalyst containing fluorine and/or chlorine. The halogen component will be composited with the carrier material in such a manner as results in a final composite containing about 0.1 to about 3.5 percent by weight of halogen, calculated on an elemental basis.

A specific illustration of this hydrocarbon hydroprocessing technique involves the use of a catalytic composite of about 0.4 percent by weight of platinum, 0.7 percent by weight of combined chlorine, 0.25 percent by weight of germanium and about 0.4 percent by weight of nickel, combined with a crystalline aluminosilicate material of which about 90.9 percent by weight constitutes faujasite. This catalyst is intended for utilization in the conversion of 16,800 bbl./day of a blend of vacuum gas oils to produce maximum quantities of a 400° F. end point gasoline boiling range fraction. The charge stock has a gravity of 24.2° API, contains 2.05 percent by weight of sulfur and 1,200 p.p.m. by weight of nitrogen, and has an initial boiling point of 600° F., a 50 percent volumetric distillation temperature of 740° F. and an end boiling point of 920° F. The charge stock is initially subjected to a cleanup operation at maximum catalyst temperature of 750° F., a combined feed ratio of 1.0 (no liquid recycle), an LHSV of 0.94 with a hydrogen circulation rate of about 10,000 s.c.f./bbl. The pressure imposed upon the catalyst within the reaction zone is about 1,800 p.s.i.g. This particular unit is designed to function in series flow; thus, the entire effluent from the cleanup zone, following heat-exchange to lower its temperature to 700° F., is passed into the hydrocracking reaction zone containing the above-described catalyst. The pressure imposed upon the second reaction zone is about 1,750 p.s.i.g., and hydrogen quench is employed in an mount of about 3,400 s.c.f./bbl. to maintain the temperature increase at a level of 20° F. The feed to the hydrocracking reaction zone is admixed with about 8,720 bbl./day of a liquid recycle stream to provide a combined liquid feed ratio of about 1.4; the liquid hourly space velocity is 0.55. Following separation of the product effluent from the second reaction zone, to concentrate the desired gasoline boiling range fraction, the remaining 400° F.-plus normally liquid material is recycled to the inlet of the second reaction zone, thus providing the combined liquid feed ratio thereto of about 1.4. In the following table, there is indicated the product yield and distribution of this process. With respect to Stage I, the yields are given in wt. percent. With respect to the Stage II effluent, the normally gaseous hydrocarbons, ammonia and hydrogen sulfide are given in terms of wt. percent, while butanes and heavier hydrocarbons are presented in vol. percent. With respect to the first reaction zone, the hydrogen consumption is 1.62 percent by weight of the fresh feed (973 s.c.f./bbl.), and for the hydrocracking reaction zone, 1.50 percent by weight of the fresh feed charge stock, or 900 s.c.f./bbl.

TABLE I:

Hydrocracking Product Yield and Distribution

| Component | Stage I | Stage II |
|---|---|---|
| Ammonia | 0.15 | 0.15 |
| Hydrogen sulfide | 2.18 | 2.18 |
| Methane | 0.15 | 0.32 |
| Ethane | 0.23 | 0.46 |
| Propane | 0.49 | 3.15 |
| Butanes | 1.08 | 20.28 |
| Pentanes | 0.88 | 13.36 |
| Hexanes | 1.08 | 17.33 |
| Heptane-400° F. | 13.75 | 73.92 |
| 400° F.-plus | 81.61 | — |

With respect to the pentane product stream, it constitutes about 93.0 percent isopentanes. An analysis of the combined pentane/hexane fraction indicates a gravity of 82.6° API, a clear research octane rating of 83.0 and a leaded research octane rating of 98.0; it will be noted that this constitutes an excellent blending component for motor fuel. The desired heptane-400° F. product indicates a gravity of 54.6° API, a clear research octane rating of 59.0 and a leaded research octane rating of 78.0. This gasoline boiling range fraction constitutes about 48.0 percent by volume paraffins, 40.0 percent by volume naphthenes and 12.0 percent by volume aromatic hydrocarbons. It will be recognized that this gasoline boiling range fraction constitutes an excellent charge stock for a catalytic reforming unit to improve the motor fuel characteristics thereof.

EXAMPLE IV

Seventy-eight parts of solid sodium aluminate, containing about 46.0 percent by weight alumina and 31.0 percent by weight of $Na_2O$, is dissolved in about 952 parts of water to form a sodium aluminate solution. To this solution is added about 194.4 parts of sodium hydroxide pellets (98.0 percent by weight NaOH). The mixture is cooled to a temperature of 75° F., and 1,180 parts of a colloidal silicate solution, containing 35.0 percent by weight of silica, is slowly added thereto. The resulting solution is stirred gently for about 1 hour at ambient temperature, followed by a quiescent age for 20 hours with occasional gentle stirring during this period. The mixture is then heated to 95° C. and aged at the higher temperature for about 48 hours. The mother liquor is separated from the formed crystals by decantation. Water is added to the vessel, and the crystals are water washed and filtered until most of the silicate ions have been removed. The substantially silicate ion-free crystals are reslurried in water to a solids concentration of about 20.0 percent by weight, and pressured through an orifice into a hot chamber at conditions to product spray dried particles of about 65 microns average diameter. These particles are introduced into a pilling machine where they are pilled into 1/8-inch cyclinders having from about 5 to about 10 pounds crushing strength. These pills are analyzed and shown to be substantially pure faujasite; that is, about 94.0 percent by weight is zeolitic in nature. The pills are dried at a temperature of about 250° F. and calcined in air at a temperature of about 900° F.

An impregnating solution is prepared from chloroplatinic acid, hydrogen chloride (aqueous), an ethanol solution of germanium tetrachloride and nickel nitrate hexahydrate. The cylindrical pills are impregnated with a sufficient quantity of the impregnating solution to result in a finished catalyst containing 0.75 percent by weight of platinum, 1.0 percent by weight of nickel, 0.75 percent by weight of germanium and 0.9 percent by weight of combined chloride. Excess water is removed by evaporation at about 210° F., and the dried, impregnated pills are calcined at a temperature of about 1,000° F. Prior to use, the pills are prereduced and sulfided, in accordance with the methods previously set forth, to incorporate about 0.5 percent by weight of sulfur.

This catalyst is disposed, in an amount of 61,370 pounds, in a hydrocracking reaction zone. The intent is to maximize the yield of LPG (liquefied petroleum gas) from a naphtha boiling range fraction. The charge stock (7,000 bbl./day) has a gravity of 59.2° API, an initial boiling point of 169° F., a 50.0 percent volumetric distillation temperature of 260° F. and an end boiling point of 375° F. This naphtha contains 640 p.p.m. by weight of sulfur and only about 1.0 p.p.m. of nitrogen, and analyses indicate 68.4 vol. percent paraffins, 17.8 vol. percent naphthenes and 13.8 vol. percent aromatics.

This commercially scaled unit utilizes a single stage with liquid recycle of a portion (hexanes-plus) of the product effluent to provide a combined liquid feed ratio of about 1.4. The hydrogen concentration is about 6,000 s.c.f./bbl., the pressure is 1,500 p.s.i.g., the LHSV (on fresh feed) is 1.0 and the maximum catalyst bed temperature is 825° F., representing a controlled increasing temperature gradient of 100° F.

In the following Table II, there is presented the yield and product distribution:

TABLE II:

LPG Production, Yield, and Distribution

| Component | Wt.% | Vol.% |
| --- | --- | --- |
| Ammonia | — | — |
| Hydrogen sulfide | 0.07 | — |
| Methane | 0.30 | — |
| Ethane | 1.61 | — |
| Propane | 25.69 | 37.54 |
| Butanes | 53.12 | 69.08 |
| Pentanes | 22.78 | 27.00 |
| Total LPG ($C_3/C_4$) | 78.81 | 106.62 |

Hydrogen consumption is about 3.57 percent by weight of the fresh naphtha feed, or about 1,752 s.c.f./bbl. Additionally, the pentane fraction, 1,890 bbl./day, indicates a gravity of 94.5, about 80.0 percent isopentanes, a clear octane rating (research method) of 86.0 and a leaded octane rating of 100.0.

The foregoing specification, and illustrations of several embodiments, indicate the method of effecting my invention and the benefits afforded through the utilization thereof.

I claim as my invention:

1. A hydrocarbon hydroprocess which comprises reacting a hydrocarbon with hydrogen at conditions selected to effect the chemical consumption of hydrogen, and in contact with a catalytic composite of a Group VIII noble metal component, a Group IV-A metal component, a nickel component and a porous carrier material.

2. The process of claim 1 further characterized in that said conditions include a pressure of from 400 to about 5,000 p.s.i.g., a liquid hourly space velocity of from 0.1 to about 10.0, a hydrogen concentration of from 1,000 to about 50,000 s.c.f./bbl. and a maximum catalyst temperature of from 200° to about 900° F.

3. The process of claim 1 further characterized in that the atomic ratio of said Group IV-A metal component to said noble metal component is in the range of about 0.05:1 to about 10.0:1.

4. The process of claim 1 further characterized in that said catalytic composite contains from 0.01 to about 2.0 percent by weight of said Group VIII noble metal component, and the atomic ratio of said nickel component to said noble metal component is in the range of about 0.2:1 to about 20.0:1.

5. The process of claim 1 further characterized in that said catalytic composite contains from about 0.1 to about 3.5 percent by weight of a halogen component, on an elemental basis.

6. A hydrocarbon hydroprocess which comprises reacting a hydrocarbon with hydrogen at conditions selected to effect chemical consumption of hydrogen, and in contact with a catalytic composite of a platinum or palladium component, a Group IV-A metal component, a nickel component and a porous carrier material; said process further characterized in that said catalytic composite is reduced and sulfided prior to contacting said hydrocarbon.

7. The process of claim 1 further characterized in that said carrier material is a crystalline aluminosilicate.

8. The process of claim 1 further characterized in that said carrier material is an amorphous refractory inorganic oxide.

9. A process for producing a cycloparaffinic hydrocarbon which comprises contacting hydrogen and an aromatic hydrocarbon in a reaction zone, in contact with a catalytic composite containing 0.01 to about 2.0 percent by weight of a Group VIII noble metal component, from about 0.01 to about 1.5 percent by weight of an alkalinous metal component, a nickel component and a Group IV-A metal component, and separating the resulting reaction zone effluent to recover said cycloparaffinic hydrocarbon.

10. A process for desulfurizing a sulfurous hydrocarbon distillate containing a monoolefinic hydrocarbons and aromatics, which process comprises reacting said distillate with hydrogen, in contact with a catalytic composite of an alumina-containing refractory inorganic oxide, a Group VIII noble metal component, a Group IV-A metal component and a nickel component.

11. A process for hydrogenating a coke-forming hydrocarbon distillate containing diolefinic and monoolefinic hydrocarbons, and aromatics, which process comprises reacting said distillate with hydrogen, at a temperature below about 500° F., in contact with a catalytic composite of an alumina-containing refractory inorganic oxide, a Group VIII noble metal component, a nickel component, an alkali metal component and a Group IV-A metal component, and recovering an aromatic/monoolefinic hydrocarbon concentrate substantially free from conjugated diolefinic hydrocarbons.

12. A process for hydrocracking a hydrocarbonaceous charge stock into lower molecular weight hydrocarbons, which process comprises reacting said charge stock with hydrogen, at hydrocracking conditions, and in contact with a catalytic composite of a porous alumina-silica carrier material, a Group VIII noble metal component, a nickel component and a Group IV-A metal component, and separating the resulting reaction zone effluent to recover said lower molecular weight hydrocarbons.

13. The process of claim 12 further characterized in that said carrier material is a crystalline aluminosilicate.

* * * * *